United States Patent [19]

Fales et al.

[11] 3,982,517

[45] Sept. 28, 1976

[54] CLOSED LOOP CARBURETOR AIR-FUEL RATIO CONTROL

[75] Inventors: Douglas I. Fales; William H. Holl, both of Flint, Mich.

[73] Assignee: General Motors Corporation, Detroit, Mich.

[22] Filed: Oct. 20, 1975

[21] Appl. No.: 623,966

[52] U.S. Cl. ............................ 123/122 D; 123/122 H
[51] Int. Cl.[2] .......................................... F02M 31/00
[58] Field of Search ....... 123/122 D, 122 H, 32 EA, 123/32 SP, 32 ST

[56] References Cited
UNITED STATES PATENTS

| | | | |
|---|---|---|---|
| 3,444,847 | 5/1969 | King | 123/122 D |
| 3,459,163 | 8/1969 | Lewis | 123/122 D |
| 3,759,232 | 9/1973 | Wahl | 123/32 EA |

Primary Examiner—Charles J. Myhre
Assistant Examiner—R. H. Lazarus
Attorney, Agent, or Firm—Robert M. Sigler

[57] ABSTRACT

A combustion engine with a carburetor and exhaust means is provided with an atmospheric air heater such as an exhaust stove. A metering valve supplies a variable mixture of heated air from the exhaust stove and cooler atmospheric air to the carburetor. The changing temperature and hence density of the air supplied to the carburetor produces a changing air-fuel ratio to the engine; and an oxygen sensor in the exhaust system generates a signal indicative of this ratio, which signal is applied through a feedback control system to actuation means for the metering valve to maintain the engine air-fuel ratio at a substantially constant predetermined level.

1 Claim, 3 Drawing Figures

CLOSED LOOP CARBURETOR AIR-FUEL RATIO CONTROL

BACKGROUND OF THE INVENTION

In the interest of more exacting control of the emissions of combustion engines, it has been suggested by many that greater control be exercised over the air-fuel ratio supplied to the engine; and one suggested manner of control is closed loop control using an oxygen sensor in the engine exhaust means. In particular, closed loop control about a predetermined ratio near stoichiometry allows the use of the so-called three way catalyst which simultaneously oxidizes hydrocarbons and carbon monoxides and reduces oxides of nitrogen. However, most such systems suggested have required replacement or modification of the carburetor with actuation means responsive to the feedback signals for controlling air-fuel ratio.

SUMMARY OF THE INVENTION

Most vehicle-mounted combustion engines now include an atmospheric air heater associated with the engine and a thermostatically controlled metering valve to mix the heated air with atmospheric air when the engine is cold. Since the carburetors of these engines are adjusted to give a lean ratio at normal operating temperatures, the incomplete vaporization of fuel at cold engine temperatures might otherwise produce missing, stalling and other undesirable engine behavior. The heated air helps promote fuel vaporization until the engine is warmed up, at which time it begins to maintain a constant intake air temperature.

However, the temperature of the air, through its density, has a further effect on engine air-fuel ratio, since the density of air entering the carburetor venturi helps controls the rate at which fuel is drawn into the mixture. This invention adds an oxygen sensor in the engine exhaust stream and a feedback loop therefrom to metering valve actuation means to regulate engine air-fuel ratio at a constant desired ratio. The system as modified continues to improve cold engine driveability; but the control of engine air-fuel ratio is more exact and continues after engine warmup.

Further details and advantages of this invention will be apparent from the accompanying drawings and following description of a preferred embodiment.

DESCRIPTION OF THE PREFERRED EMBODIMENT

Figure 1:
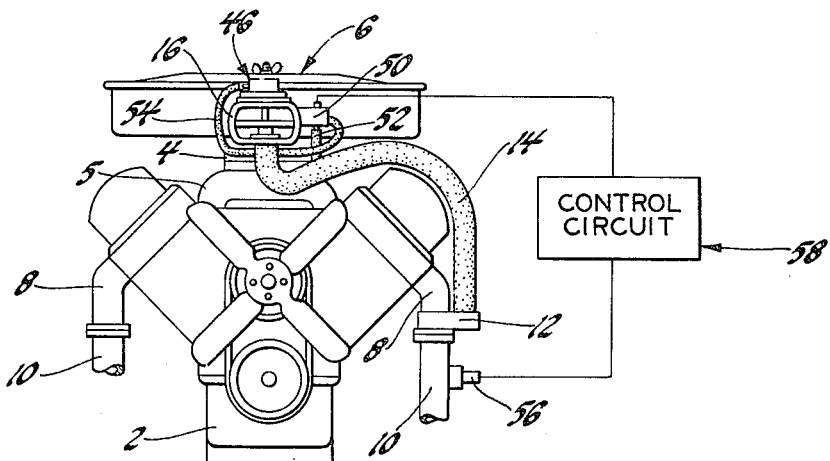
FIG. 1 shows an engine modified according to this invention.

Referring to FIG. 1, a combustion engine 2, which is typically an internal combustion, gasoline powered, vehicle-mounted engine, is supplied with air and fuel in a controlled ratio by a carburetor 4. The fuel is obtained from conventional fuel storage and delivery means, not shown; and the air is obtained from the atmosphere through an air cleaner 6.

Engine 2 is also provided with exhaust means including exhaust manifold 8 and exhaust conduits 10. Associated with one of the exhaust manifolds 8 is an air heater or stove 12 of the conventional type which brings atmospheric air into contact with a metal surface heated by the passage of exhaust gases on its opposite side. This generally takes the form of a metal housing which bolts over at least a portion of the exhaust manifold and has an inlet opening at one end thereof and an outlet attached to conduit means at the other end thereof. Conduit means 14 are provided to conduct heated air from heater 12 to the snorkel portion 16 of air cleaner 6.

Figure 2:
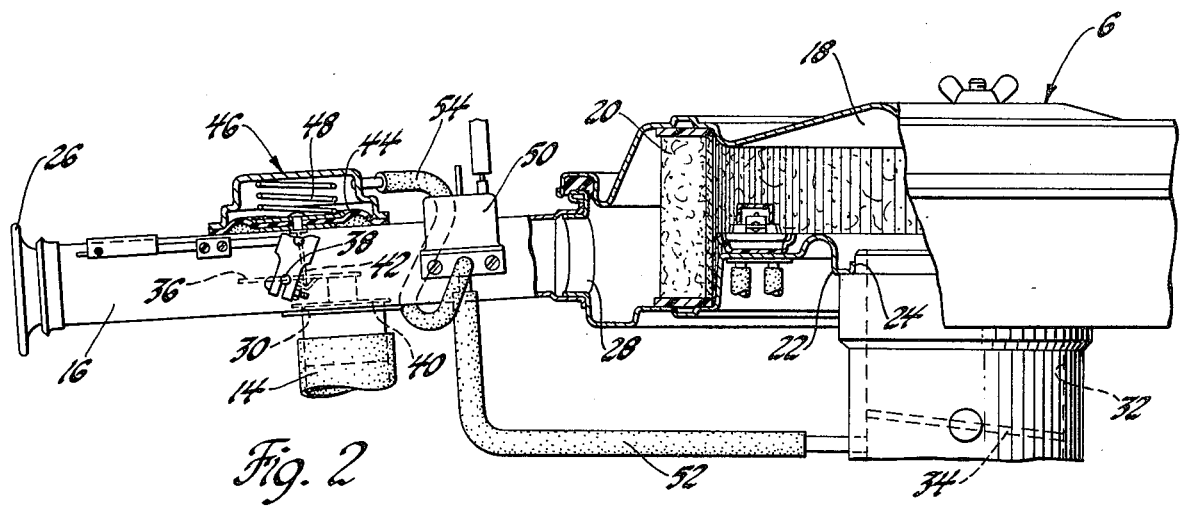
FIG. 2 shows a side partial cutaway view of an engine air cleaner and carburetor modified according to this invention.

Referring to FIG. 2, air cleaner and silencer assembly 6 defines a silencing chamber 18 within which an air filter element 20 is disposed. A flange 22 at the base of assembly 6 surrounds an outlet 24 and registers with the inlet of carburetor 4. Snorkel 16 of assembly 6 extends from a flared end 26, open to air at ambient or under-hood temperatures, to an inlet 28 opening into chamber 18. Snorkel 16 also has a lateral opening 30 to which conduit 14 is attached.

Carburetor 4 and intake manifold 5 define an induction passage 32 in which a throttle 34 is disposed to control the air flow to engine 2. Carburetor 4 further includes standard means for delivering fuel to the air flowing therethrough, which means are not shown in these drawings.

Valve 36, pivoted at 38 in snorkel 16, may be swung between the position shown, where it prevents heated air flow through opening 30 by means of an extension 40, and a position preventing air flow through the open end 26 of snorkel 16. In the position shown, only air at ambient temperature may be admitted to the engine, but as valve 36 rotates and extension 40 is moved from opening 30, increasing amounts of heated air and decreasing amounts of ambient air are admitted and mixed to flow to engine 2.

Valve 36 is secured by a rod 42 to the diaphragm 44 of a vacuum motor 46 and is biased to the position shown by a spring 48. As vacuum signals above about six inches mercury are applied to diaphragm 44 against the force of spring 48, valve 36 is pivoted from the position shown to heat the induction air flow above ambient temperatures.

Vacuum is supplied to vacuum motor 46 from induction passage 32 below throttle 34 through a conduit 52, a solenoid actuated vacuum valve 50 and another conduit 54. Solenoid vacuum valve 50 is an electromagnetically controlled valve including a solenoid coil shown as 92 in FIG. 3. This valve is of a standard type well-known in the art.

Referring again to FIG. 1, an exhaust sensor 56, preferably an oxygen sensor and particularly that type known in the art as a zirconia sensor, provides a signal indicative of engine air-fuel ratio to a control circuit 58. Control circuit 58 modifies this signal and applies the modified signal to solenoid vacuum valve 50.

Figure 3:
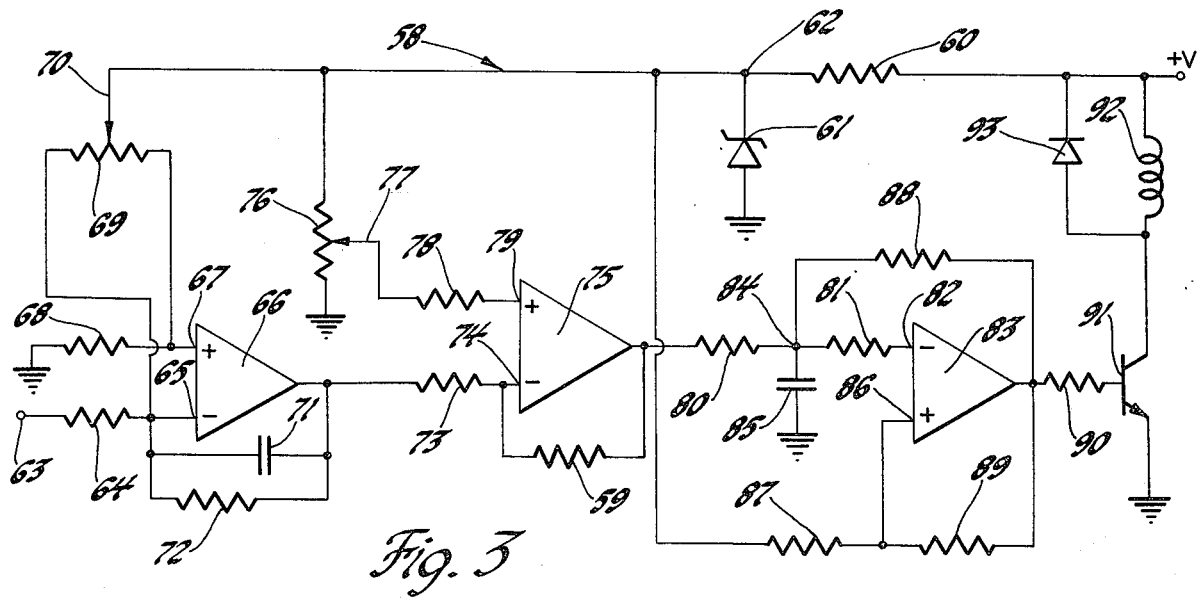
FIG. 3 shows a control circuit for use with this invention.

Although there are many control circuits known to those skilled in the art of feedback control systems that could be used for control circuit 58, one example of such a system is shown in FIG. 3. Circuit 58 is designed to be powered by a low voltage DC power supply such as the typical vehicle-mounted storage battery with alternator and voltage regulator. The connection of this power supply to circuit 58 is through the terminal marked +V. Thus the power supply is connected through a resistor 60 and zener diode 61 to ground to produce a voltage at junction 62 between resistor 60 and zener diode 61 regulated by zener diode 61. This junction 62 is the source of bias for the operational amplifiers to be enumerated below.

The signal from sensor 56 is applied to a terminal 63 connected through a resistor 64 to the negative input 65 of an operational amplifier 66. Operational amplifier 66 and those other operational amplifiers enumerated below are Norton current mode operational amplifiers in this embodiment. The positive input 67 of amplifier 66 is connected through a resistor 68 to ground and another resistor 69 to negative input 65. A variable tap 70 of resistor 69 is connected to junction 62.

The output of operational amplifier 66 is connected back through a capacitor 71 and parallel resistor 72 to negative input 65 and also through a resistor 73 to the negative input 74 of an operational amplifier 75. A resistor 76 is connected between junction 62 and ground; and a variable tap 77 of resistor 76 is connected through a resistor 78 to the positive input 79 of amplifier 75.

The output of operational amplifier 75 is connected through a resistor 59 to negative input 74 and through a resistor 80 and another resistor 81 in series to the negative input 82 of an operational amplifier 83. The junction 84 of resistors 80 and 81 is connected through a capacitor 85 to ground. The positive input 86 of amplifier 83 is connected through a resistor 87 to junction 62.

The output of amplifier 83 is connected through a resistor 88 to junction 84, through a resistor 89 to positive input 86 and through a resistor 90 to the base of a transistor 91. Transistor 91 has a grounded emitter and a collector connected through an inductive coil 92 and parallel backbiased diode 93 to terminal +V. Inductive coil 92 is the valve positioning solenoid within vacuum valve 50.

Circuit 58 operates as follows. The output signal from sensor 56 and a number of constant reference voltages are applied to amplifier 66 through resistors 64, 68 and 69. Feedback capacitor 71 and resistor 72 cause amplifier 66 to produce a combined proportional and time-integral signal which is applied to amplifier 75, where it is summed with a reference provided through resistors 76 and 78.

Amplifier 83, together with resistors 81, 87, 88 and 89, comprise an oscillator with a square wave output. The application of a varying signal from amplifier 75 through resistor 80 to junction 84 results in a variable duty-cycle operation of the oscillator: the proportion of high output voltage to low output voltage in the square wave varies with the voltage signal applied to junction 84. The output of this oscillator is applied through resistor 90 to power transistor 91 to turn transistor 91 on and off in accordance with the variable duty-cycle. The current through coil 92 is thus changed in accordance with the same duty-cycle, as is the application of induction vacuum to vacuum motor 46 by vacuum valve 50. The combination of the volume of chamber 48, the spring force, the area of the diaphragm, and the supply restrictions of the vacuum motor 46 provide an averaging effect on the position of valve 50 to position valve 36 generally in accordance with the average voltage produced in the variable duty-cycle within circuit 58. Diode 93 is a standard protection for transistor 91 switching an inductive load.

In the operation of the complete system, it has been seen that the signal of sensor 56, indicative of engine air-fuel ratio, produces a variable duty-cycle output from control circuit 58 which causes valve 50 to vary the application of induction vacuum to vacuum motor 46 and thus position valve 36. The position of valve 36 determines the ratio of hot air from heater 12 through conduit 14 to cooler atmospheric air through flared end 26 of snorkel 16 to be provided through induction passage 32 to engine 2. The changing temperature and hence density of this air causes variations in the air-fuel ratio produced by carburetor 4, which variations are always in the direction to return the air-fuel ratio to the predetermined air-fuel ratio. Thermostats or other elements may still be necessary to actuate valve 36 when the engine is first started from a cold start, since a zirconia sensor itself must warm up to produce an output signal. However, sensor 56 will quickly warm up to operating temperature, from which point it will provide close control of engine air-fuel ratio.

It should be noted that this invention operates to control engine air-fuel ratio during the idle mode. This is not so on those systems which apply the feedback signal to position the main carburetor metering rods, since at idle the fuel is supplied to the engine from separate idle jets not controlled by these rods. However, since this invention varies air density rather than fuel flow, it operates to control air-fuel ratio even when most fuel is being supplied through the idle jets.

This invention is then seen to be apparatus for reducing undesirable exhaust emissions from an engine with a catalytic converter by controlling air-fuel ratio of the engine about stoichiometry using a feedback loop without the necessity of replacing or making expensive internal changes in the engine carburetor. The minimization of changes to the carburetor not only reduces retooling costs but also presents the possibility of adapting the system in retrofit to existing vehicles, especially those already equipped with the atmospheric air heater.

The reader should bear in mind that the described embodiment of this invention, although preferred, is not the only embodiment that will occur to those skilled in the art. Therefore the invention should be limited only by the claim which follows.

The embodiments of the invention in which an exclusive property or privilege is claimed are defined as follows:

1. Apparatus for maintaining a substantially constant predetermined air-fuel ratio in a combustion engine having a carburetor and exhaust means, the apparatus comprising:

means for heating atmospheric air;
a metering valve effective to mix heated air from the air heating means with atmospheric air in variable ratio to produce air of varying temperature and hence density determined by the setting of the metering valve, the metering valve communicating with the carburetor to supply substantially all the air for engine combustion, the carburetor being effective to vary the air-fuel ratio in response to the changing temperature and hence density of the air supplied thereto;
sensor means in the exhaust means effective to generate a signal indicative of engine air-fuel ratio; and
valve actuation means continuously responsive to the air-fuel ratio signal to vary the valve setting to reduce the difference between the air-fuel ratio and the predetermined air-fuel ratio, whereby the air-fuel ratio is maintained substantially constant at the predetermined air-fuel ratio.

* * * * *